Oct. 19, 1948.                C. S. INGRAM                 2,451,953
                        METER PROTECTION CIRCUIT
                          Filed Aug. 9, 1946
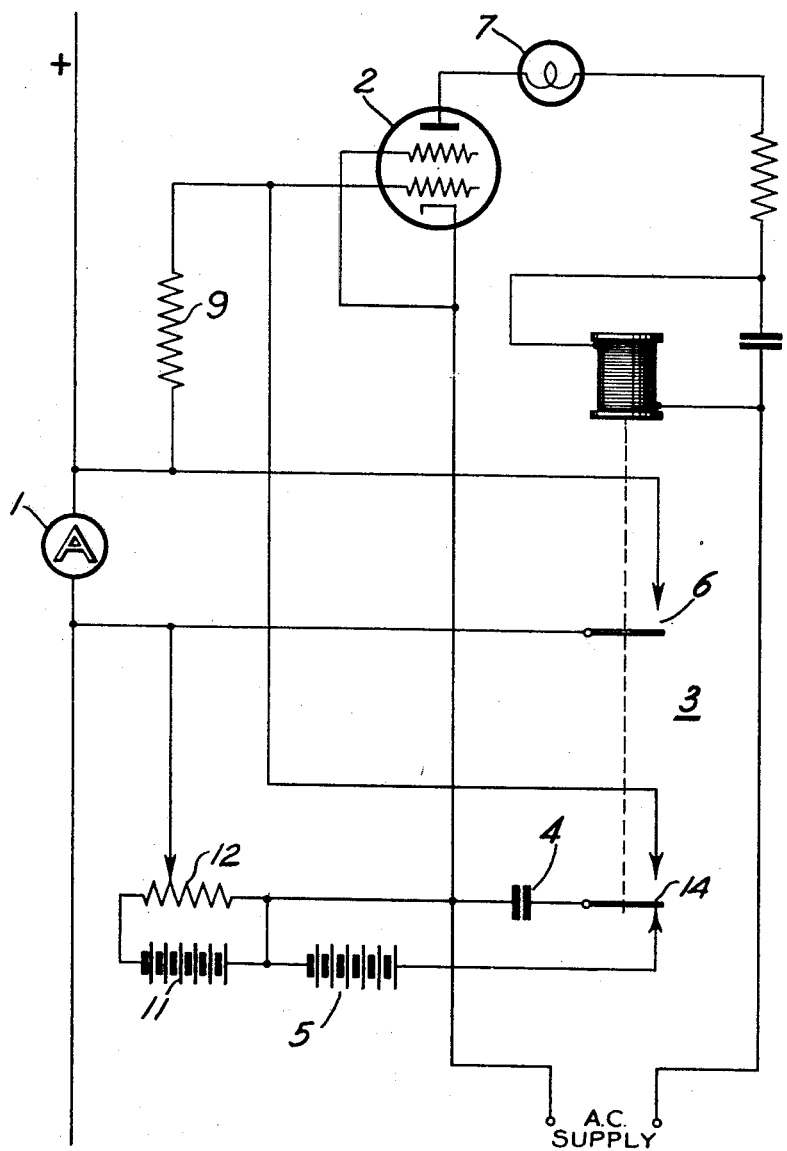
INVENTOR.
CURTIS S. INGRAM
BY Robert A. Lavender
ATTORNEY Patented Oct. 19, 1948

2,451,953

UNITED STATES PATENT OFFICE 2,451,953

METER PROTECTION CIRCUIT

Curtis S. Ingram, Fairfax, Calif., assignor to the United States of America as represented by the United States Atomic Energy Commission Application August 9, 1946, Serial No. 689,477

4 Claims. (Cl. 171—95)

This invention relates to an electric meter protection circuit in general. More particularly, this invention relates to an electric meter protection circuit for the purpose of protecting the meter from overload.

An object of this invention is to provide a thyratron circuit for protecting an electric meter from abnormal currents.

Other and further objects of this invention will be apparent to those skilled in the art to which it relates from the following specification, claims and drawing.

Referring to the drawing briefly, the sole figure thereof illustrates a schematic wiring diagram of an embodiment of this invention.

Referring to the drawing in detail, reference numeral 1 designates an electric meter for measuring currents and this meter is connected in series with the electric conductor, as shown. In order to protect a meter from damage against overloads, a shunt circuit including normally open contacts 6 of a slow acting relay 3, is connected around the meter. Relay 3 is energizable (to close the shunt circuit) through a normally nonconducting thyratron 2, the thyratron and relay winding being connected in series in an A. C. supply line. The thyratron control grid is connected through a resistance 9 to the positive side of the meter 1 and the thyratron cathode is connected through a circuit including a potentiometer 12 and battery 11 to the negative side of the ammeter. The thyratron grid bias is then the algebraic sum of the voltage drop across the ammeter and the voltage between the potentiometer contact and the thyratron cathode. Due to the polarity with which the battery 11 is connected across the potentiometer 12, the potentiometer voltage opposes the ammeter voltage drop and thus the thyratron grid bias is actually the difference between ammeter voltage drop and potentiometer voltage. Thus if it be assumed merely for the sake of explanation that the thyratron will fire with a zero potential on the grid, the potentiometer voltage is adjusted to just equal the voltage drop across the ammeter at the maximum allowable meter overload. Any lesser voltage drop across the ammeter will leave the thyratron grid bias negative, thus preventing the thyratron from firing, while a maximum allowable overload or more on the meter will increase the grid bias to zero or positive, thus firing the thyratron.

The relay 3 is provided with further contacts 14 of the single pole double throw type. When the relay 3 is not energized, contacts 14 complete a battery condenser circuit, as shown, during which time the condenser 4 is charged to the potential of the battery 5. When the relay 3 is actuated the contacts 14 complete a circuit from the condenser 4 to the thyratron grid, and through resistance 9, contacts 6 and potentiometer 12, back to the opposite side of condenser 4. When the thyratron fires and actuates the relay 3 the contacts 6 close, shorting the meter. With the meter shorted the grid bias would then be negative and the thyratron would fail to fire on the next positive half cycle of plate voltage; however, the relay 3 also actuates contacts 14 which then completes the above described circuit and places the positive condenser voltage on the thyratron grid. Thus the thyratron grid remains positive for the time it takes for condenser 4 to discharge, which is determined by the relative values of charge on condenser 4, resistance 9, and voltage across the potentiometer 12. The thyratron therefore continues firing for a specific period which may be set by the proper choice of the value of the above variables. A condenser connected across the relay actuating coil stores energy during one half cycle of the A. C. voltage and discharges this energy during the other half cycle, thus maintaining a more even current flow through the relay coil. Furthermore the relay 3 is the slow acting type so that the relay actually remains actuated throughout the time that the thyratron is firing on half cycles of A. C. plate voltage.

As long as the current through the meter 1 is in a safe range, the thyratron 2 remains nonconducting, the armatures of a slow-to-release relay 3 are in the lower position, and a condenser 4 is charged to the voltage of battery 5. When the current through the meter exceeds a safe value, the thyratron 2 is rendered conducting during alternate half cycles of the voltage applied from the A. C. supply, causing the armatures of relay 3 to close in the upper position, thus shorting out the meter at contacts 6 and placing the thyratron under the control of the condenser 4. As soon as the condenser 4 discharges, the thyratron grid bias becomes negative and the thyratron fails to fire on the following positive half cycle of plate voltage, thus opening the relay contacts 6 and 14. If the current through the meter is still above the safe value, the meter is again short-circuited. Despite the fact that in this case the relay 3 again closes almost instantaneously, the absence of resistance in the condenser-battery circuit allows the condenser 4 to charge practically instantaneously so that there is a positive voltage again applied to the thyratron grid when the relay 3 is energized. The lighting of the lamp 7 is indicative of the overload condition.

While I have described the salient features of this invention in detail with respect to one embodiment, it will of course be apparent that numerous modifications may be made within the spirit and scope of this invention and I do not therefore desire to limit the invention to the exact details shown except in so far as they may be defined in the following claims.

What is claimed is:

1. A control circuit comprising a gaseous discharge tube provided with an anode and a cathode and a control electrode, a plate circuit connected between said anode and said cathode and including a relay and a source of alternating current potential, means for applying a predetermined potential between said cathode and said control electrode in order to alter the conductivity of said tube from a first value to a second value, whereby said relay is operated from a first position to a second position, and means responsive to the operation of said relay to said second position for maintaining for a predetermined time interval a voltage between said cathode and said control electrode capable of retaining the conductivity of said tube at said second value, whereby said relay is reoperated from said second position back to said first position at the conclusion of said predetermined time interval.

2. In combination with a load circuit and a meter for measuring electric current therein, an overload protection circuit including a gas filled electron tube having an anode, cathode and control electrode, a plate circuit joining said anode and cathode including a slow release relay and a source of alternating current potential, means including said meter to apply a potential between said cathode and control electrode whereby a predetermined potential difference across said meter alters the conductivity of said tube from a first value to a second value, a first and a second relay position corresponding to said first and second value of tube conductance, means responsive to said second relay position to impress for a predetermined time interval a potential between said cathode and control electrode sufficient to maintain the tube at said second value of conductivity, further means responsive to said second relay position to effectively disconnect said meter.

3. In a load circuit having a meter therein to measure electrical current the combination comprising a gas discharge tube having an anode, cathode, and control electrode, a plate circuit connecting said anode and cathode and including the actuating coil of a slow acting relay and a source of alternating current potential, an adjustable constant source of potential applied between said cathode and control electrode, means arranged and adapted to apply any potential differential across said meter between said cathode and control electrode, thereby initiating a discharge within said tube at a predetermined potential differential across said meter, a first set of relay contacts connected across said meter closing upon energization of said relay coil, thereby effectively disconnecting said meter from said load circuit, further relay contacts closing upon energization of said relay coil and impressing thereby a particular amount of positive charge upon said gas discharge tube control electrode, whereby said gas discharge tube is constrained to continue firing on positive half cycles of anode potential for a predetermined interval.

4. In combination with a meter in an electrical circuit, an overload protection circuit electrically connected in parallel with said meter and including a gas discharge tube having anode, cathode, and control electrode, a slow release relay having two sets of contacts each having a normal and operating position, a source of alternating current power, said relay and power source being connected in series between said thyratron anode and cathode, a potentiometer and battery connected in parallel and the combination in turn being connected in series with said meter between the thyratron control electrode and cathode, a battery and condenser directly connected by a first set of relay contacts in normal position, a circuit including said first set of relay contacts in operating position connecting the positive side of said condenser to said thyratron control electrode, and a further circuit connecting the opposite sides of said meter and including the second set of relay contacts which complete said circuit when in operated position.

CURTIS S. INGRAM.

REFERENCES CITED

The following references are of record in the file of this patent:

UNITED STATES PATENTS

| Number | Name | Date |
|---|---|---|
| 2,009,973 | Nelson | July 30, 1935 |